United States Patent
Martin et al.

(10) Patent No.: US 6,397,083 B2
(45) Date of Patent: *May 28, 2002

(54) BOOTSTRAPPED, PIECEWISE-ASYMPTOTIC DIRECTIVITY PATTERN CONTROL MECHANISM SETTING WEIGHTING COEFFICIENTS OF PHASED ARRAY ANTENNA

(75) Inventors: Gayle Patrick Martin, Merritt Island; Steven D. Halford, Melbourne; John C. Henry, III, Indialantic, all of FL (US)

(73) Assignee: Harris Corporation, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/782,767

(22) Filed: Feb. 13, 2001

Related U.S. Application Data (63) Continuation of application No. 09/081,460, filed on May 19, 1998, now Pat. No. 6,188,915.

(51) Int. Cl.[7] .................................................. H04B 1/38
(52) U.S. Cl. ................. 455/562; 455/277.2; 455/278.1; 342/378; 342/380; 342/381; 342/383
(58) Field of Search .......................... 455/277.1, 277.2, 455/278.1, 279.1, 561, 562; 342/380, 381, 383, 378

(56) References Cited

U.S. PATENT DOCUMENTS

| | | | |
|---|---|---|---|
| 4,079,379 A | 3/1978 | Piesinger | 342/368 |
| 5,471,647 A | 11/1995 | Gerlach et al. | 455/63 |
| 5,542,101 A | 7/1996 | Pal | 455/65 |
| 5,592,490 A | 1/1997 | Barratt et al. | 370/310 |
| 5,634,199 A | 5/1997 | Gerlach et al. | 455/63 |
| 5,854,612 A | 12/1998 | Kamiya et al. | 342/383 |
| 5,929,811 A | 7/1999 | Rilling | 342/380 |
| 5,952,968 A | 9/1999 | McDowell | 342/383 |
| 5,999,826 A | 12/1999 | Whinnett | 455/562 |
| 6,188,915 B1 * | 2/2001 | Martin et al. | 455/562 |

* cited by examiner

*Primary Examiner*—Edward F. Urban
*Assistant Examiner*—Temica M. Davis
(74) *Attorney, Agent, or Firm*—Allen, Dyer, Doppelt Mlibrath & Gilchrist, P.A.

(57) ABSTRACT

Weighting coefficients for a phased array antenna are iteratively refined to optimal values by a 'bootstrapped' process that starts with a coarse set of weighting coefficients, to which received signals are subjected, to produce a first set of signal estimates. These estimates and the received signals are iteratively processed a prescribed number of times to refine the weighting coefficients, such that the gain and/or nulls of antenna's directivity pattern will maximize the signal to noise ratio. Such improved functionality is particularly useful in association with the phased array antenna of a base station of a time division multiple access (TDMA) cellular communication system, where it is necessary to cancel interference from co-channel users located in cells adjacent to the cell containing a desired user and the base station.

20 Claims, 7 Drawing Sheets

BOOTSTRAPPED, PIECEWISE-ASYMPTOTIC DIRECTIVITY PATTERN CONTROL MECHANISM SETTING WEIGHTING COEFFICIENTS OF PHASED ARRAY ANTENNA

CROSS-REFERENCE TO RELATED APPLICATIONS

The present application is a continuation of Ser. No. 09/081,460, filed May 19, 1998, now U.S. Pat. No. 6,188,915, issued Feb. 13, 2001. In addition, the present invention relates to subject matter disclosed in the following by co-pending patent applications, filed coincidentally herewith: Ser. No. 09/081,287 (hereinafter referred to as the '287 application), by K. Halford et al, entitled: "Selective Modification of Antenna Directivity Pattern to Adaptively Cancel Co-channel Interference in TDMA Cellular Communication System," and Ser. No. 09/081,476 (hereinafter referred to as the '476 application), now U.S. Pat. No. 6,147,657, issued Nov. 14, 2000, by R. Hildebrand et al, entitled "Circular Phased Array Antenna Having Non-Uniform Angular Separations Between Successively Adjacent Elements," each of which is assigned to the assignee of the present application and the disclosures of which are incorporated herein.

FIELD OF THE INVENTION

The present invention relates in general to communication systems, and is particularly directed to a new and improved signal processing mechanism for rapidly and optimally setting weighting coefficient values of respective elements of a multi-element antenna, such as a phased array antenna employed to controllably form a beam whose gain and/or nulls are defined so as to maximize the signal to noise ratio. Such improved functionality makes the invention particularly useful in association with the phased array antenna of a base station of a time division multiple access (TDMA) cellular communication system, where it is necessary to cancel interference from co-channel users located in cells adjacent to the cell containing a desired user and the base station.

BACKGROUND OF THE INVENTION

Figure 1:
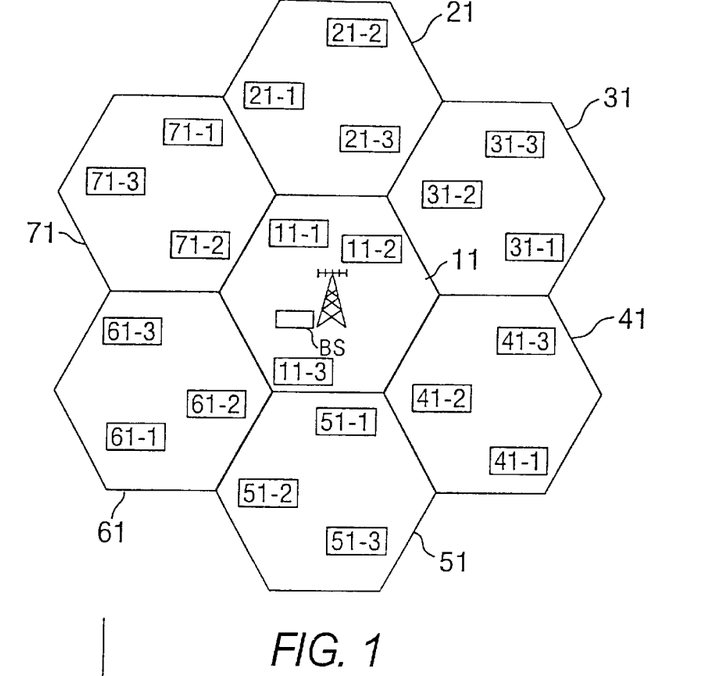
FIG. 1 is a simplified diagrammatic illustration of the cell distribution of a time division multiple access (TDMA) cellular communication system.

As described in the above-referenced '287 Halford et al application, in a TDMA cellular communication system, a simplified illustration of which is diagrammatically shown in FIG. 1, communications between a base station BS and a desired user 11-1 in a centroid cell 11 are subject to potential interference by co-channel transmissions from users in cells dispersed relative to the cell of interest (cell 11), particularly immediately adjacent cells shown at 21–71. This potential for co-channel interference is due to the fact that the same frequency is assigned to multiple system users, who transmit during respectively different time slots.

In the non-limiting simplified example of FIG. 1, where each cell has a time division reuse allocation of three (a given channel is subdivided into three user time slots), preventing interference with communications between user 11-1 and its base station BS from each co-channel user in the surrounding cells 21–71 would appear to be an ominous task—ostensibly requiring the placement of eighteen nulls in the directivity pattern of the antenna employed by the centroid cell's base station BS.

In accordance with the invention disclosed in the '287 application, this problem is successfully addressed by determining the times of occurrence of synchronization patterns of monitored co-channel transmissions from users in the adjacent cells, and using this timing information to periodically update a set of amplitude and phase weights (weighting coefficients) for controlling the directivity pattern of a phased array antenna. Namely, the weighting coefficients are updated as participants in the pool of interferers change (in a time division multiplexed manner), so as to maintain the desired user effectively free from co-channel interference sourced from any of the adjacent cells.

In addition to being applied to the weighting elements, the updated weighting coefficients are stored in memory until the next cyclically repeating occurrence of the time slot of the last (in time) entry in the current pool of co-channel participants. In response to this next occurrence, the set of weight control values for the current pool is updated and used to adjust the phased array's directivity pattern, so that the nulls in the directivity pattern effectively follow co-channel users of adjacent cells. The newly updated weight set is then stored until the next (periodically repeated) update interval for the current co-channel user pool, and so on.

Since the maximum number of nulls than can be placed in the directivity pattern of a phased array antenna is only one less than the number of elements of the array, the fact that the number of TDMA co-channel interferers who may be transmitting at any given instant is a small fraction of the total number of potential co-channel interferers (e.g., six versus eighteen in the above example) allows the hardware complexity and cost of the base station's phased array antenna to be considerably reduced. However, because the locations of co-channel interferers and therefore the placement of nulls is dynamic and spatially variable, the antenna directivity pattern must be controlled very accurately; in particular, excessive sidelobes that are created by grating effects customarily inherent in a phased array having a spatially periodic geometry must be avoided.

Figures 2, 3:
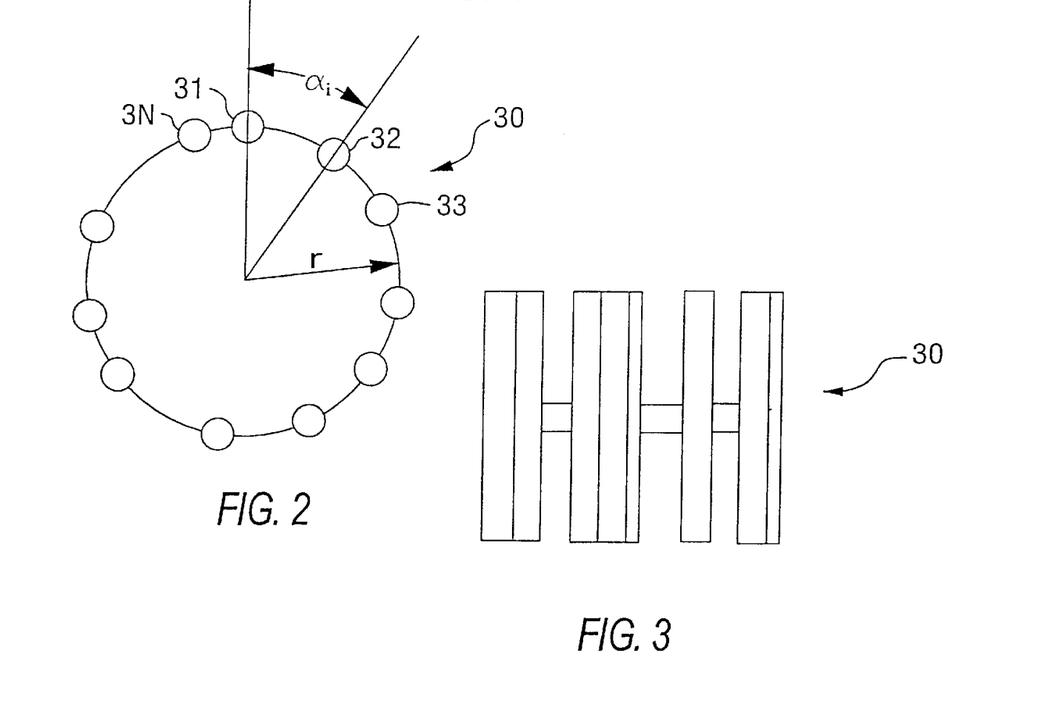
FIGS. 2 and 3 are respective diagrammatic plan and side views of an embodiment of the spatially decorrelated antenna array according to the present invention.

In accordance with the invention described in the above-referenced '476 Hildebrand er al application, and diagrammatically illustrated in FIGS. 2 and 3, this unwanted sidelobe/grating effect is minimized by using a spatially aperiodic phased array geometry, in which a plurality of N antenna elements (such as dipole elements) 31, 32, 33, . . . , 3N are unequally distributed or spaced apart from one another in a two-dimensional, generally planar array 30, shown as lying along a circle 40 having a center 41. This unequal distribution is effective to decorrelate angular and linear separations among elements of the array.

Each dipole 3$i$ of the circular array is oriented orthogonal to the plane of the array, so as to produce a directivity pattern that is generally parallel to the plane of the array. Via control of amplitude and phase weighting elements coupled in the feed for each dipole element, the composite directivity pattern of the array is controllably definable to place a main lobe on a desired user, and one or more nulls along (N−1) radial lines 'r' emanating from the center 41 of the array toward adjacent cells containing potential interfering co-channel users. Namely, for any angle of incidence of a received signal, the vector distance from any point along that radial direction to any two elements of the array is unequal and uniformly distributed in phase (modulo $2\pi$).

What results is a spatially decorrelated antenna element separation scheme, in which no two pairs of successively adjacent antenna elements have the same angular or chord separation. Without spacial correlation among any of the elements of the array, sidelobes of individual elements, rather than constructively reinforcing one another into unwanted composite sidelobes of substantial magnitude, are diminished, thereby allowing nulls of substantial depth to be placed upon co-channel interferers.

As further described in the '287 Halford et al application, non-limiting examples of weighting coefficient algorithms that may be employed for determining the values of the weighting coefficients and thereby the directivity pattern of the base station's phased array antenna include the "Maximum SNR Method," described in the text "Introduction to Adaptive Arrays," by R. Monzingo et al, published 1980, by Wiley and Sons, N.Y., and the PSF algorithm described in U.S. Pat. No. 4,255,791 (the '791 patent) to P. Martin, entitled: "Signal Processing System," issued Mar. 10, 1981, assigned to the assignee of the present application and the disclosure of which is herein incorporated.

SUMMARY OF THE INVENTION

The present invention is directed to an alternative approach to the PSF algorithm described in the abovereferenced '791 patent, that is particularly useful in a dynamic environment, such as a TDM cellular communication system environment, in which the number of and spatial location of participants may undergo changes, mandating the need for a weighting coefficient control mechanism that is able to make rapid real time adjustments with effectively little or no knowledge of the environment being addressed.

Pursuant to the invention, this objective is successfully achieved by an iterative or 'bootstrapped', piecewise-asymptotic directivity pattern control mechanism, that is operative to continuously monitor signals as received by a plurality of antenna elements and to process these signals in accordance with an iterative weighting coefficient processing mechanism, so as to produce a set of (amplitude and phase) weighting coefficients through which the directivity pattern is controlled so as to maximize the signal to noise ratio. The received signals for the monitored user channel of interest, as modified by the adaptively updated weighting coefficients, are then output to a downstream demodulator.

In order for the adaptive weighting coefficient control mechanism of the present invention to 'bootstrap' itself, it starts off with a relatively coarse, but reasonably well defined set of weighting coefficients, that have a positive signal-to-noise ratio, such as a bit error rate on the order of one in ten, as a non-limiting example. The actual signals received by the antenna elements are modified by this initial set of weights to produce a first set of estimates of the information signal contents of the received signals. Using this initial set of signal estimates and the actual signals received by the antenna elements (and buffered as necessary for iterative signal processing, as will be described), the initial set of weighting coefficients are refined by means of a prescribed signal processing operator.

The signal processing operator includes a data decision unit, to which the modified received signal estimates are supplied, and a signal transform operator, to which both the unmodified or 'raw' data representative of the received signals from the antenna elements and the output of the data decision unit are applied. If a priori knowledge of the signal is available, the data decision unit may comprise a data demodulator or other similar component, that uses such knowledge to derive an initial data estimate output signal. Alternatively, the data decision unit may comprise a relatively simple signal processing component, such as a hard-limiter or bit-slice unit, that does not require a priori knowledge of the signal, as long as the received signal has some degree of coherence.

Using the signal processing scheme described in the above-identified '791 patent, the signal transform operator produces an output containing two components—one containing the desired information signal component S(t) and a noise component n(t) of the form $Ad(t)\cos(\omega t+\phi)+n(t)$, where d(t) is data and A is amplitude, and the other of which is a transformed noise signal component $\eta(t)$ that is uncorrelated with any other signal, including the noise component n(t). Since the transformed noise signal component $\eta(t)$ is uncorrelated with any other signal, then the correlated energy E is such that $E((n(t)*S(t))=0, E((\eta(t)*n(t))=0$, and $E((\eta(t)*S(t))=0$, leaving only $E((S(t)*S(t))$ proportional to $S^2(t)$.

The actually received signal input (S+N) and the output (S+$\eta$) of the signal transform operator are applied to a correlation–multiplier operator to produce a noise signal set/matrix ($\eta$–N). The individual signal components of the signal input (S+N) are multiplied by signal components of the output (S+$\eta$), while the components of the noise signal set/matrix ($\eta$–N) are multiplied to produce a desired signal covariance matrix Rs and a noise covariance matrix Rn. In order to derive the actual values of the updated weighting coefficients, these desired signal and noise covariance matrices Rs and Rn are applied to a coefficient multiplier, which generates the matrix product of the inverse of the noise covariance matrix $Rn^{-1}$, the useful signal matrix Rs and the previous values of the weighting coefficients W. This matrix product is a set of refined or updated set of weighting coefficients Wu, that replace the previous set of weights, such as an initial set of weights used at the start of the iterative process. The temporarily buffered signals are then modified by the updated weights Wu via a matrix multiplier, to produce an 'improved' signal estimate.

For each subsequent iteration of the weighting coefficient update sequence, the values of the signal estimates are applied to the data decision unit in place of the previous estimates. Since the updated weighting coefficients produce better estimates of the received signals, the improved signal estimates will result in more accurate weighting coefficients at the next iteration. Analysis has shown that the degree of improvement of each iteration follows a non-linear track, that is asymptotic to some final 'ideal' value, and that the improvement differential between sequential iterations along this asymptotic variation typically becomes very small after only a small number of iterations, e.g., only two in the case of a TDM cellular system. This rapid iterative asymptotic refinement is significant in real time or quasi real time signal processing applications, where throughput delay must be minimized. The number of iterations is preferably determined by simulating the signal processing application of interest.

DETAILED DESCRIPTION

Before describing in detail the new and improved iterative weighting coefficient generation scheme in accordance with the present invention, it should be observed that the invention resides primarily in what is effectively a prescribed arrangement of conventional communication circuits and associated signal processing components and attendant supervisory control circuitry therefor, that controls the operations of such circuits and components. Consequently, the configuration of such circuits and components, and the manner in which they are interfaced with other communication system equipment have, for the most part, been illustrated in the drawings by readily understandable block diagrams. These diagrams show only those details that are pertinent to the present invention, so as not to obscure the disclosure with details which will be readily apparent to those skilled in the art having the benefit of the present description. Thus, the block diagram illustrations are primarily intended to show the major components of the system in a convenient functional grouping, whereby the present invention may be more readily understood.

Figure 4:
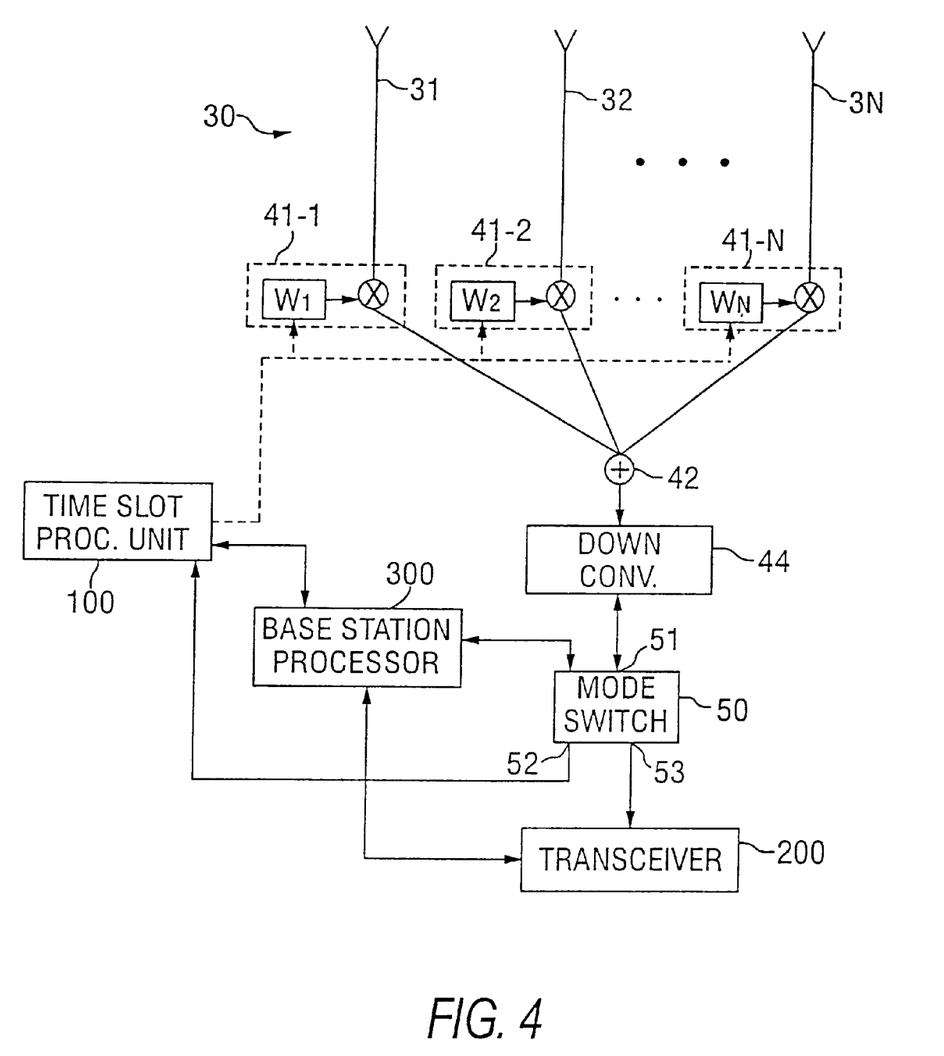
FIG. 4 diagrammatically shows the overall signal processing arrangement of a cellular communication system base station of the type described in the above-referenced '287 Halford et al application.

Referring now to FIG. 4 the overall signal processing arrangement of a cellular communication system base station of the type described in the above-referenced '287 Halford et al application is diagrammatically shown as comprising a phased array antenna 30 having a plurality of antenna elements 31, 32, . . . , 3N, coupled to respective weighting circuits 41-1, 41-2, . . . , 41-N. Each respective weighting circuit 41-i is coupled to receive a set of amplitude and phase weighting coefficients $(W_A, W_\phi)_i$, shown as weights $W_1, \ldots, W_N$ supplied by a weighting coefficient control operator employed by a time slot processing unit 100. This weighting coefficient control operator (to be described in detail below with reference to FIGS. 5–9) adjusts a set of values of the amplitude and phase weighting coefficients $(W_A, W_\phi)_i$ for each respective weighting circuit 41-i of the antenna array 30, as necessary, to form a desired beam.

The outputs of the respective weighting circuits 41-1–41-N are summed in a summing unit 42, and coupled to an RF-IF downconverter 44, the output of which is coupled to a first port 51 of a mode switch 50. Mode switch 50 has a second port 52 coupled to time slot processing unit 100, and a third port 53 coupled to a transceiver 200. Under the control of the base station's supervisory processor 300, the mode switch 50 selectively couples the elements of the antenna array 30 to one of the time slot processing unit 100 and the base station transceiver 200.

In timing acquisition mode, the phased array 30 is coupled to time slot processing unit 100 during one of the time slots available to users in the cell 11 for traffic signalling, but currently unassigned to any of those users, so that the timing relationship between the time slots assigned to users within the base station's cell and those of the adjacent cells containing potential co-channel interferers may be determined, as described in the above-referenced '287 Halford et al application. This timing relationship information is then used by a weighting coefficient control operator to dynamically update the antenna's weighting coefficients. (In traffic signalling mode the array is coupled to base station transceiver 200).

As described briefly above, the characteristics of a cellular system may provide one or more a priori known parameters (such as aspects of the control channel to be handed off to traffic channel, the order of switching of the traffic channels'TDM time slots, which traffic channels are currently unassigned and therefore may be monitored for noise content, etc.,) that enable the initial weighting coefficients of the iterative weighting coefficient operator of the present invention to be set at a reasonably high degree of accuracy (e.g., on the order of ninety-percent). As a result, in a cellular system application, the iterative weighting coefficient operator of the present invention is able to rapidly converge (e.g., usually within one or two iterations) to a final set of weighting coefficients, using only reduced length data segments (which are subject to change at the time division multiplex switching rate of the time slots of the users of the cellular system) as inputs.

Figure 5:
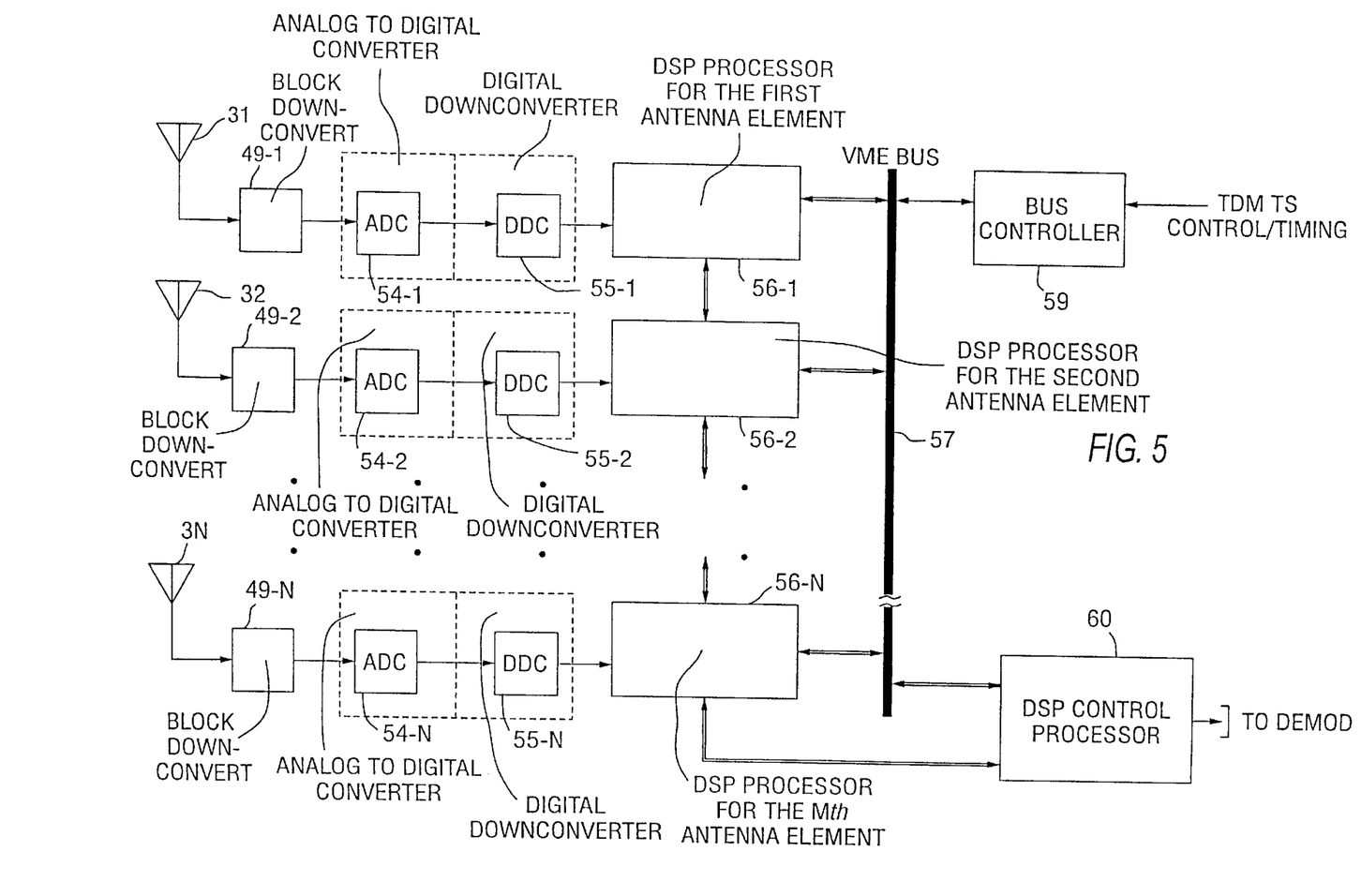
FIG. 5 diagrammatically illustrates the general signal processing architecture employed by the time slot processing unit 100 of FIG. 4 to implement the iterative weighting coefficient control operator of the present invention for a respective user channel of a cellular application.

The general signal processing architecture employed by the time slot processing unit 100 which may be used to implement the iterative weighting coefficient control operator of the present invention for a respective user channel of such a cellular application is diagrammatically illustrated in FIG. 5. As shown therein a respective channel signal received through each antenna element's weighting circuit 41, after initial downconversion in a downconverter 49, is digitized in a respective analog-to-digital converter 54-i and then further digitally downconverted via a digital downconverter 55-i to fall within the digital signal processing baseband parameters of an associated digital signal processor (DSP) 56-i. Each digital signal processor 56 is coupled via a communications industry standard VME bus 57, having an associated bus controller 59, to a supervisory control processor 60.

As will be described, the supervisory control processor 60 is operative to continuously monitor signals as received by each antenna element of the phased array and to process these signals in accordance with the iterative weighting coefficient processing mechanism of the invention, so as to produce a set of weighting coefficients through which the directivity pattern is controlled so as to maximize the signal to noise ratio. The received signals for the monitored user channel of interest, as modified by the stored weighting coefficients adaptively updated by the weighting coefficient algorithm executed by the control processor 60, are then output to a downstream demodulator (not shown).

Figure 6:
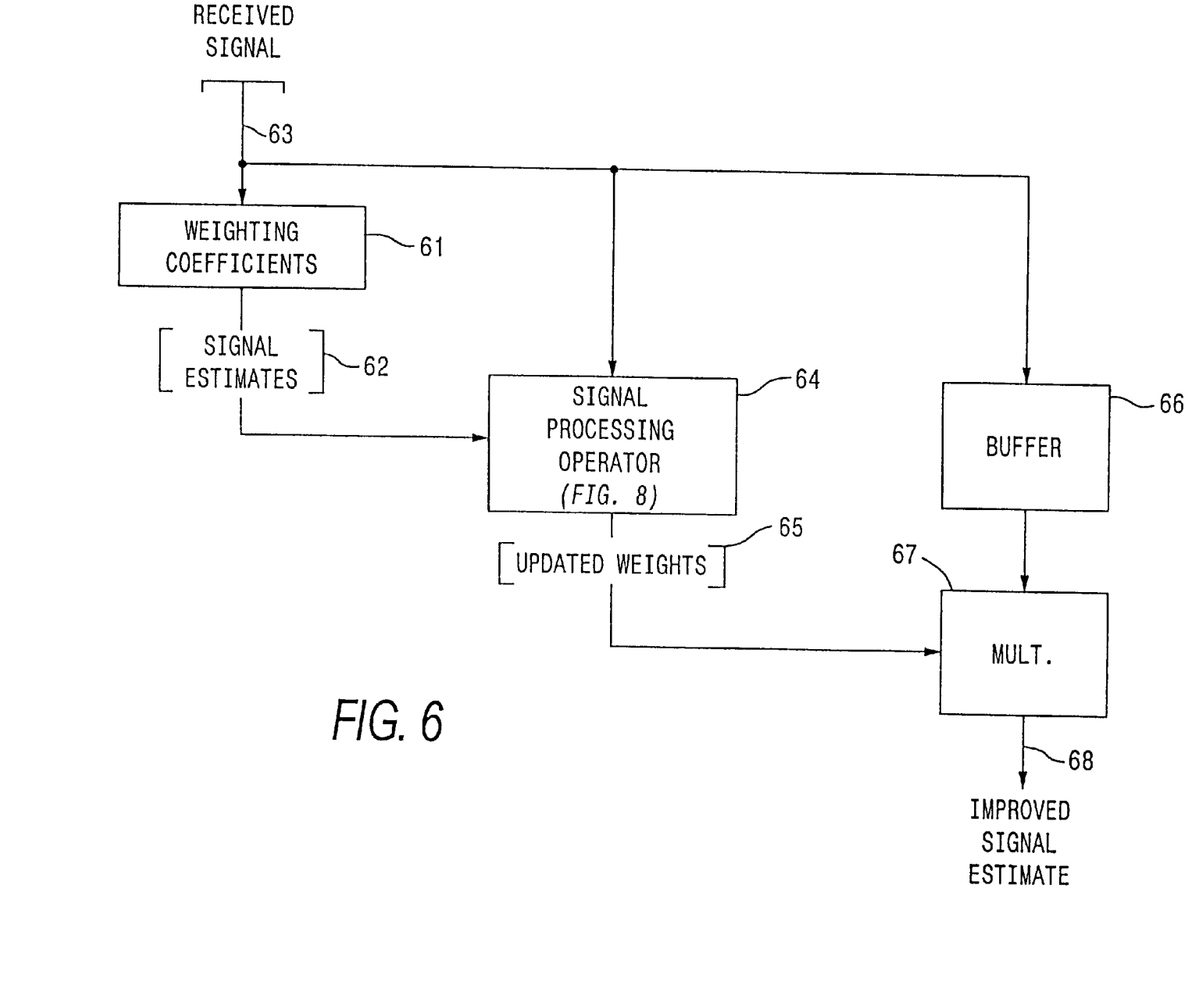
FIG. 6 diagrammatically illustrates the functional signal processing modules carried out by the adaptive weighting coefficient control mechanism within the control processor of the weighting coefficient control operator of FIG. 5.
Figure 7:
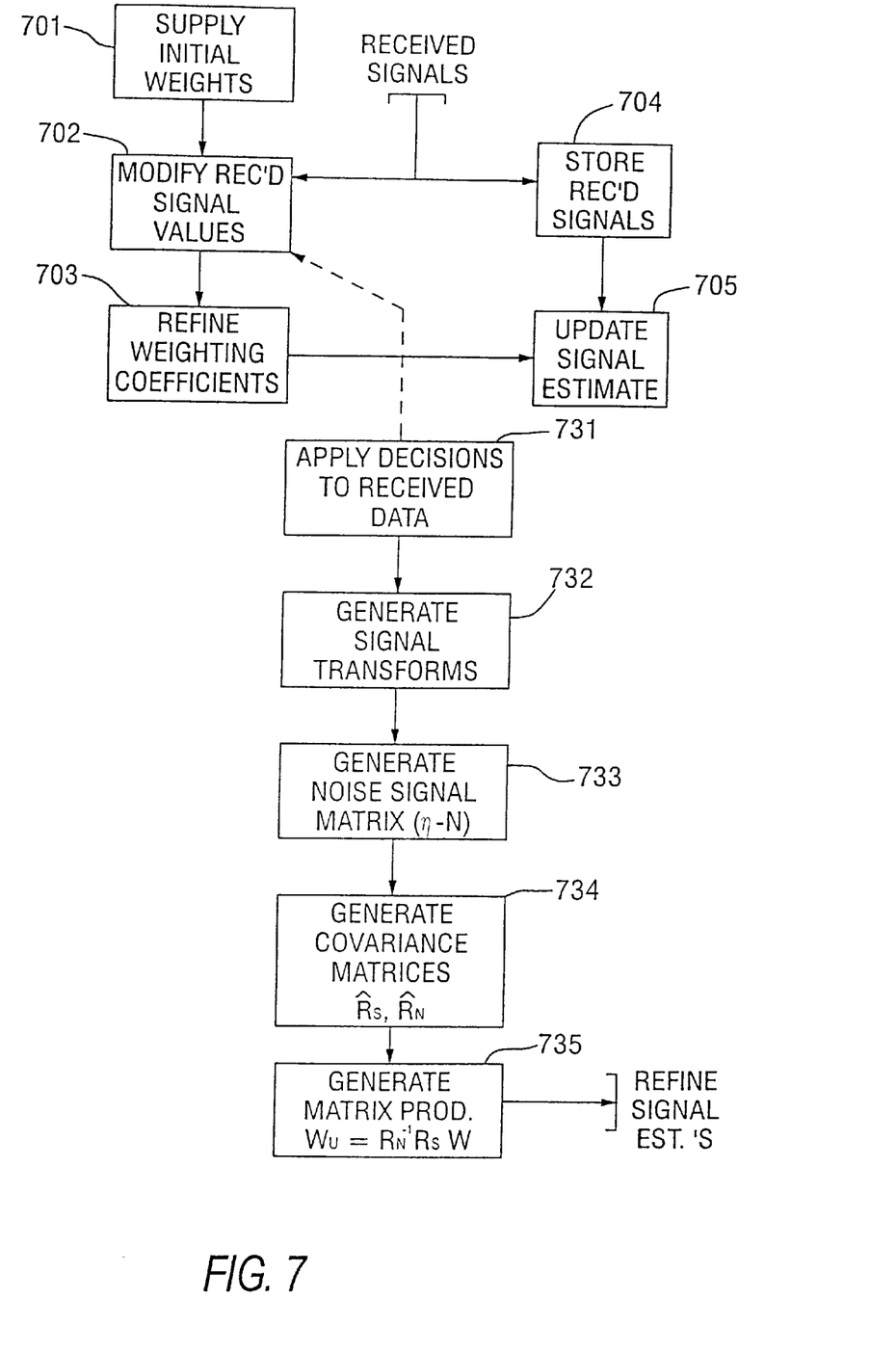
FIG. 7 is a flow chart of the respective steps associated with the functional modules of FIG. 6.

FIG. 6 diagrammatically illustrates the functional signal processing modules carried out by the adaptive weighting coefficient control mechanism within the control processor 60 of the weighting coefficient control operator of FIG. 5, while FIG. 7 is a flow chart of the respective steps associated with the functional modules of FIG. 6.

As described above, in order for the present invention to 'bootstrap' itself, it starts off with a relatively coarse, but still, reasonably well defined set of weighting coefficients, shown as an initial set of weights 61 in FIG. 6, and as step 701 in FIG. 7. By reasonably well defined is meant weighting coefficients that have a positive signal-to-noise ratio, such as a bit error rate on the order of one in ten, as a non-limiting example. While such a coarse performance parameter may be unacceptable for a finally processed signal, its ninety percent accuracy value will enable the invention to rapidly converge the antenna's weighting coefficients to a final set of values.

Empirical examination has shown that only two iterations are required for the cellular TDM system application of the present example. (As pointed out above, the initial values of the weights may be those associated with the control channel, or derived from a precursor observation of the background noise for an unassigned traffic channel of interest, to provide a reasonably 'good' first set of weighting coefficients, upon which the refinement algorithm of the invention may operate.)

As shown at 62 in FIG. 6 and step 702 in FIG. 7, the actual signals 63 received by the antenna elements of the phased array are then modified by this initial set of weights 61 to produce a first set of estimates of the information signal contents of the received signals. Using this initial set of signal estimates 62 and the actual signals 63 received by the antenna elements, the initial set of weighting coefficients 61 are then refined at a step 703 by means of a prescribed signal processing operator 64. As shown by a set of sub-steps 731–735 embodied within step 703, and as will be described below with reference to FIG. 8, operator 64 generates improved values of the weighting coefficients 65 using respective sets of signal and noise covariances that it has derived by correlating the estimates and the raw data. At step 704, the actually received signals are temporarily stored in buffer 66, to accommodate the processing throughput of the signal processing operator 64. These buffered data values are then modified via a matrix multiplier 67 to produce an 'improved' signal estimate 68, at step 705.

Figure 8:
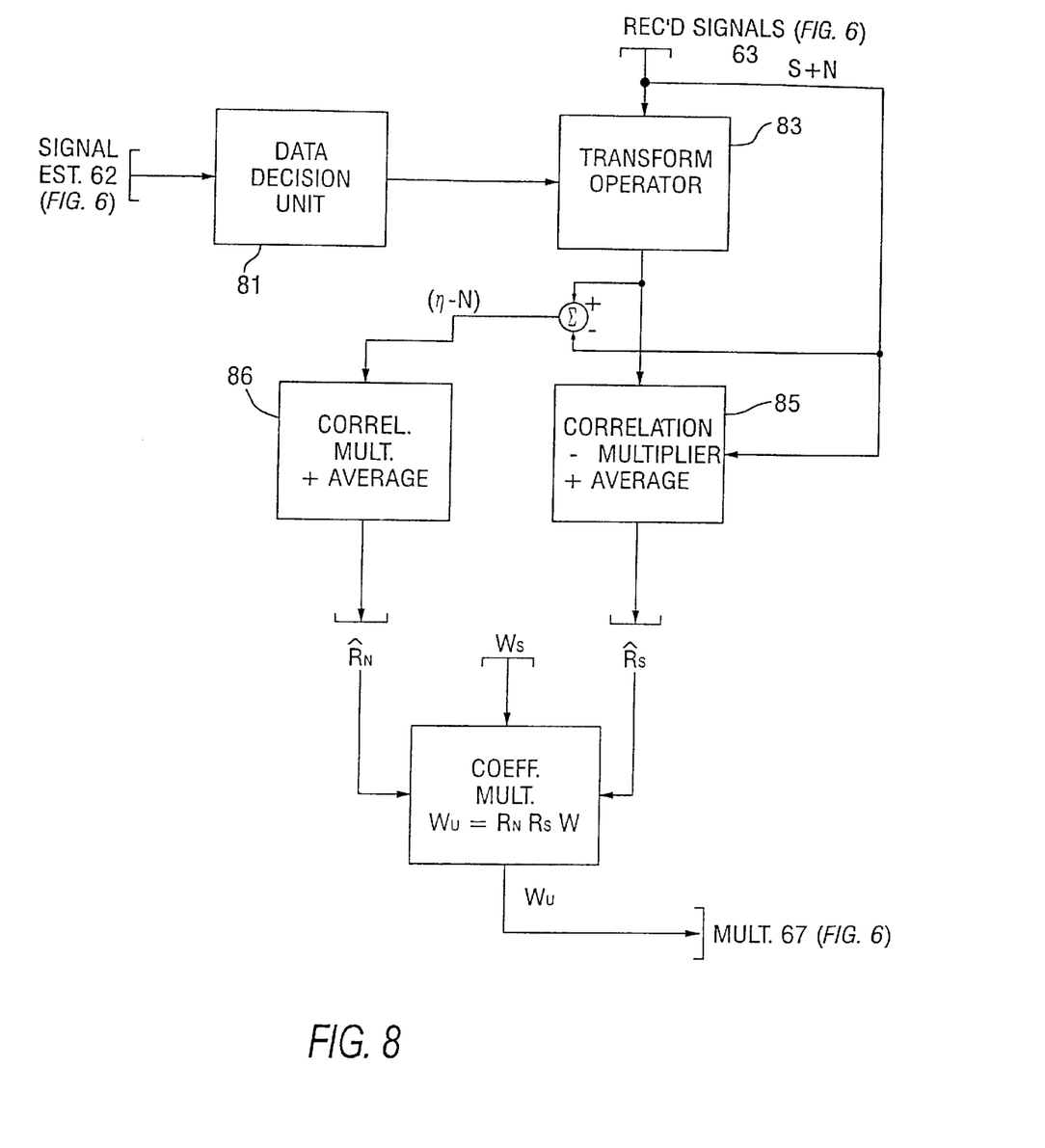
FIG. 8 shows the composition of the signal processing operator 64 of FIG. 6.
Figure 9:
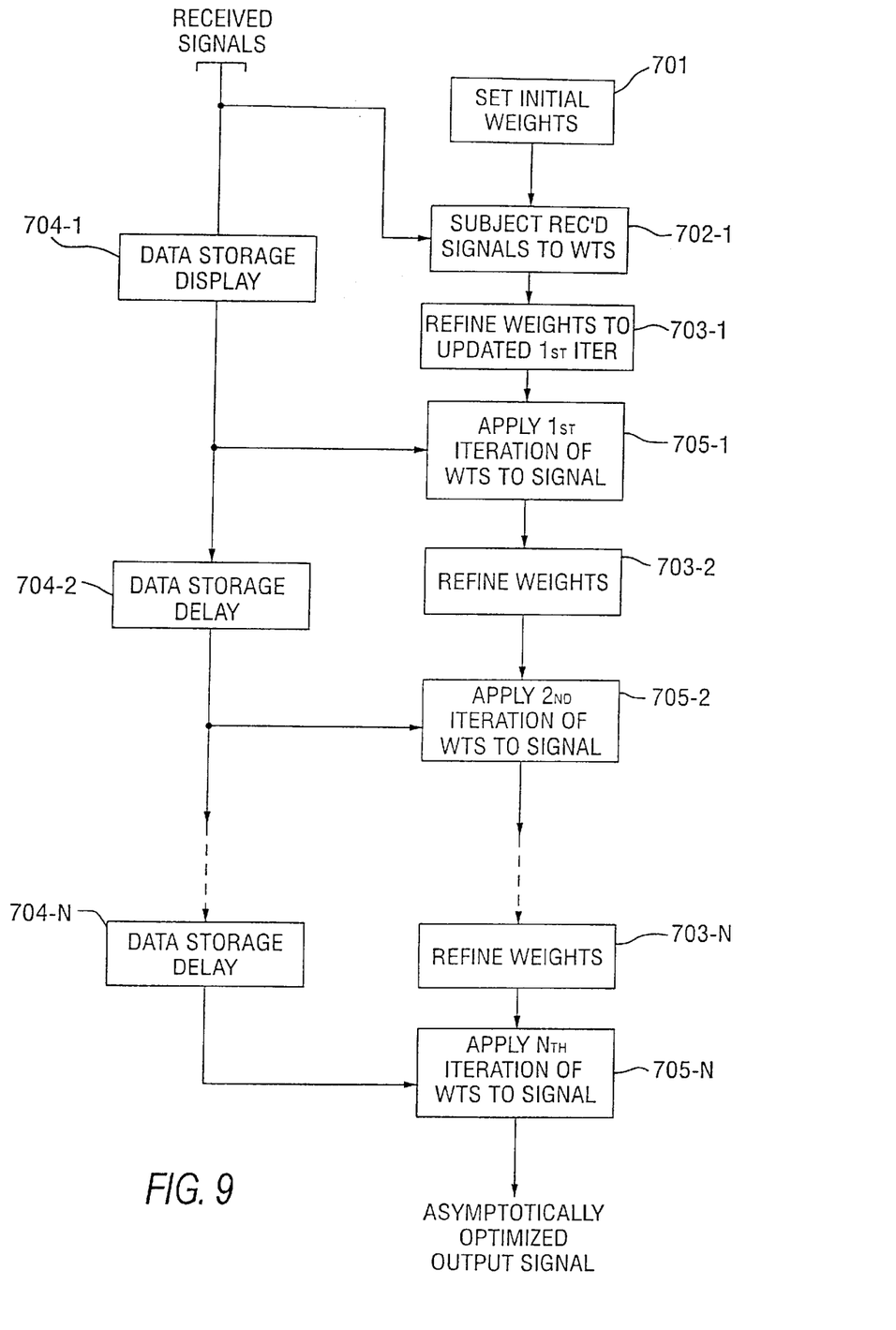
FIG. 9 diagrammatically illustrates the iterative processing scheme of the present invention for an arbitrary number N of iterations.

Referring now to FIG. 8, the signal processing operator 64 is shown as including a data decision unit 81, to which the modified received signal estimates 62 are supplied, and a signal transform operator 83, to which both the unmodified or 'raw' data representative of the received signals from the antenna elements and the output of the data decision unit 81 are applied, as shown at sub-step 731 of step 703. As a non-limiting example, if a priori knowledge of the signal is available, the data decision unit 81 may comprise a data demodulator or other similar component, that uses such knowledge to derive an initial data estimate output signal. Alternatively, data decision unit 81 may comprise a relatively simple signal processing component, such as a hard-limiter or bit-slice unit, that does not require a priori knowledge of the signal, as long as the received signal has some degree of coherence (namely, other than a white noise characteristic).

The signal transform operator 83 may correspond to the signal recognizer described in the above-referenced '791 patent, except that the reference signal for the signal transform operator is derived from the data decision unit 81, rather than being an a priori known signal. At sub-step 732, the signal transform operator 83 produces an output containing two components—one of which contains the desired information signal component S(t) in the received signal (which includes both a desired signal component S(t) and a noise component n(t) of the form $Ad(t)\cos(\chi t+\phi)+n(t)$, where d(t) is data and A is amplitude), and the other of which is a transformed noise signal component $\eta(t)$ that is uncorrelated with any other signal, including the noise component n(t). Since the transformed noise signal component $\eta(t)$ is uncorrelated with any other signal, then not only is the correlated energy $E((n(t)*S(t))=0$, but $E((\eta(t)*n(t))=0$, and $E((\eta(t)*S(t))=0$, leaving only $E((S(t)*S(t))$ proportional to $S^2(t)$.

At sub-step 733, the raw signal input (S+N) to, and the output (S+$\eta$) of, the signal transform operator 83 are processed via a correlation-multiplier function to produce a noise signal set/matrix ($\eta$–N). At sub-step 734, the individual signal components of the raw signal input (S+N) are then multiplied in a multiplication operator 85 by signal components of the output (S+$\eta$), while the noise differential components of the noise signal set/matrix ($\eta$–N are multiplied in a multiplication operator 86, to produce a useful or desired signal covariance matrix Rs and a noise covariance matrix Rn. In order to derive the actual values of the updated weighting coefficients, these useful signal and noise covariance matrices Rs and Rn produced by multiplication operators 84 and 85 are applied at sub-step 735 to a coefficient multiplier 86, which generates the matrix product of the inverse of the noise covariance matrix Rn$^-$, the useful signal matrix Rs and the previous values of the weighting coefficients Ws. This matrix product is a set of refined or updated set of weighting coefficients Wu, that are to replace the previous set of weights, such as an initial set of weights used at the start of the iterative process. Next, at step 705, the temporarily stored or buffered signals are then modified by the updated weights Wu via matrix multiplier 67, to produce an 'improved' signal estimate 68.

For each subsequent iteration of the weighting coefficient update sequence described above, the values of the signal estimates produced at 68 are applied to the data decision unit 81 at step 703 in place of the previous estimates (which used the initial coarse weight values during the first iteration, as described). Because the updated weighting coefficients produce better estimates of the received signals, the improved signal estimates, in turn, will result in more accurate weighting coefficients at the next iteration. Analysis has shown that not only does the degree of improvement of each iteration follow a non-linear track, that is asymptotic to some final 'ideal' value, but that the improvement differential between sequential iterations along this asymptotic variation typically becomes very small after only a small number of iterations, e.g., only two in the case of a TDM cellular system, as described above.

This is of particular significance in real time or quasi real time signal processing applications, where throughput delay must be minimized. To this end, the number of iterations is preferably determined by simulating the signal processing application of interest, rather than using a signal-to-noise ratio comparator between iterations. The iterative processing scheme of the present invention for producing an asymptotically optimized signal estimate from N iterations is diagrammatically illustrated in the flow sequence of FIG. 9, wherein the respective steps are identified by the reference numerals of the flow chart of FIG. 7 described above.

As will be appreciated from the foregoing description, the adaptive weighting coefficient control mechanism of the present invention is able to 'bootstrap' itself, starting with a relatively coarse, but reasonably well defined set of weighting coefficients, that have a positive signal-to-noise ratio. Received signals are subjected to this initial set of weights to produce a first set of signal estimates. These estimates and the received signals are iteratively processed a prescribed number of times to refine the weighting coefficients to optimal values, such that the gain and/or nulls of antenna's directivity pattern will maximize the signal to noise ratio. Such improved functionality makes the invention particularly useful in association with the phased array antenna of a base station of a time division multiple access (TDMA) cellular communication system, where it is necessary to cancel interference from co-channel users located in cells adjacent to the cell containing a desired user and the base station.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controlling the directivity pattern of a phased array antenna comprising the steps of:
   (a) generating weighting coefficients for signal coupling paths of antenna elements of said phased array antenna;
   (b) modifying signals representative of outputs of said antenna elements in accordance with said weighting coefficients;
   (c) generating estimates of information contents of signals modified in step (b);
   (d) combining estimates of said information signal contents of signals representative of outputs of said antenna elements and signals representative of information signal contents and noise signal contents of outputs of said antenna elements to produce respective sets of signal and noise covariances;
   (e) updating said weighting coefficients in accordance with said sets of signal and noise covariances;
   (f) adjusting said signals representative of outputs of said antenna elements in accordance with said updated weighting coefficients to produce updated signal outputs of said antenna elements;
   (g) iteratively repeating steps (e) and (f).

2. The method according to claim 1, wherein step (g) comprises iteratively repeating steps (e) and (f), as necessary, to bring the signal-to-noise ratio of said updated signal outputs of said antenna elements to within a prescribed value.

3. The method according to claim 1, wherein step (f) comprises generating products of said signals representative of outputs of said antenna elements and said updated weighting coefficients to produce updated signal outputs of said antenna elements.

4. The method according to claim 1, wherein step (f) comprises generating said updated weighting coefficients in accordance with products of previous weighting coefficients and said sets of signal and noise covariances.

5. The method according to claim 1, wherein step (d) comprises combining estimates of said information signal contents of signals representative of outputs of said antenna elements and signals representative of information signal contents and noise signal contents of outputs of said antenna elements, to produce useful signal components and uncorrelated noise signal components, and producing said respective sets of signal covariances in accordance with said information signal contents of outputs of said antenna elements and said useful signal components, and producing said respective sets of noise covariances in accordance with said noise signal contents of outputs of said antenna elements and said uncorrelated noise signal components.

6. The method according to claim 1, wherein step (c) comprises demodulating said signals representative of outputs of said antenna elements as modified in step (b) to generate said estimates of information signal contents of signals representative of outputs of said antenna elements.

7. The method according to claim 1, where in step (a) comprises providing initial weighting coefficients exclusive of information available in performing steps (c) through (g).

8. The method according to claim 1, wherein step (c) comprises subjecting said signals representative of outputs of said antenna elements as modified in step (b) to a limiter operator to generate said estimates of information signal contents of signals representative of outputs of said antenna elements.

9. The method according to claim 1, wherein step (d) includes the preliminary step of storing said signals representative of outputs of said antenna elements, step (e) comprises subjecting the stored signals and said estimates of information signal contents of signals representative of outputs of said antenna elements to a prescribed signal processing operator to derive improved values of said weighting coefficients, and step (f) comprises adjusting the stored signals in accordance with said updated weighting coefficients to produce improved signal outputs of said antenna elements.

10. The method according to claim 1, wherein said phased array antenna is installed at a cell base station of a multi-cell, time division multiple access (TDMA) cellular communication system, and has its directivity pattern adaptively modified in steps (a)–(g), so as to form a directivity pattern having gain and/or nulls that effectively maximize the signal-to-noise ratio in the presence of co-channel users whose communication time slots overlap a communication time slot of a desired user.

11. The method according to claim 10, wherein steps (a)–(g) are performed during an unused time slot, to derive weighting coefficients that are effective to maximize the signal-to-noise ratio in the presence of co-channel users whose communication time slots overlap a communication time slot of said desired user.

12. The method according to claim 11, wherein steps (a)–(g) are carried out by receiving transmissions from users in dispersed cells exclusive of a transmission from said desired user, and further including the step (h) of processing contents of said transmissions from said users to determine relative offsets between said users' time slots and said desired user's time slot.

13. A base station signal processing arrangement for a time division multiple access (TDMA) cellular communication system, which includes a plurality of cells dispersed relative to a cell in which a desired user conducts communications with a base station in said cell, and wherein said dispersed cells contain co-channel users which may transmit during time slots that overlap a desired user's time slot used for communications between said desired user and said base station, said base station signal processing arrangement comprising:
   a phased array antenna; and
   a signal processor, coupled to said phased array antenna and being operative to:
      (a) generate said weighting coefficients for signal coupling paths of antenna elements of said phased array antenna;
      (b) modify signals representative of outputs of said antenna elements in accordance with said weighting coefficients,
      (c) generate estimates of information signal contents of said modified signals,
      (d) combine estimates of said information signal contents of signals representative of outputs of said antenna elements and signals representative of information signal contents and noise signal contents of outputs of said antenna elements to produce respective sets of signal and noise covariances,
      (e) update said weighting coefficients in accordance with said sets of signal and noise covariances, (f) adjust said signals representative of outputs of said antenna elements in accordance with said updated weighting coefficients to produce updated signal outputs of said antenna elements, and (g) iteratively repeat steps (e) and (f), and thereby adaptively control the directivity pattern of said phased array antenna so as to maximize signal-to-noise ratio in the presence of co-channel users whose communication time slots overlap said desired user's time slot and thereby reduce interference between said desired user and said base station.

14. The base station signal processing arrangement according to claim 13, wherein said signal processor is operative to perform step (f) by generating products of said signals representative of outputs of said antenna elements and said updated weighting coefficients to produce updated signal outputs of said antenna elements.

15. The base station signal processing arrangement according to claim 13, wherein said signal processor is operative to perform step (f) by generating updated weighting coefficients in accordance with products of previous weighting coefficients and said sets of signal and noise covariances.

16. The base station signal processing arrangement according to claim 13, wherein said signal processor operative to perform step (d) by combining estimates of said information signal contents of signals representative of outputs of said antenna elements and signals representative of information signal contents and noise signal contents of outputs of said antenna elements, to produce useful signal components and uncorrelated noise signal components, to produce said respective sets of signal covariances in accordance with said information signal contents of outputs of said antenna elements and said useful signal components, and produce said respective sets of noise covariances in accordance with said noise signal contents of outputs of said antenna elements and said uncorrelated noise signal components.

17. The base station signal processing arrangement according to claim 13, wherein said signal processor is operative to perform step (c) by demodulating said modified signals to generate said estimates of information signal contents of signals representative of outputs of said antenna elements.

18. The base station signal processing arrangement according to claim 13, wherein said signal processor is operative to perform step (a) by providing initial weighting coefficients exclusive of information available in steps (c) through (g).

19. The base station signal processing arrangement according to claim 13, wherein said signal processor is operative to perform step (c) by subjecting said modified signals to a limiter operator to generate said estimates of information signal contents of signals representative of outputs of said antenna elements.

20. The base station signal processing arrangement according to claim 13, wherein said signal processor is operative to store signals representative of outputs of said antenna elements, to perform in step (e) by subjecting the stored signals and said estimates of information signal contents of signals representative of outputs of said antenna elements to a prescribed signal processing operator to derive improved values of said weighting coefficients, and to perform step (f) by adjusting the stored signals in accordance with said updated weighting coefficients to produce improved signal outputs of said antenna elements.

* * * * *

UNITED STATES PATENT AND TRADEMARK OFFICE
CERTIFICATE OF CORRECTION

PATENT NO.    : 6,397,083 B2
DATED         : May 28, 2002
INVENTOR(S)   : Gayle Patrick Martin, Steven D. Halford and John C. Henry, III It is certified that error appears in the above-identified patent and that said Letters Patent is hereby corrected as shown below:

Drawings,
Delete Figure 8 insert new Figure 8:
  --

FIG. 8

--

Column 2,
Line 38, delete "er al" insert -- et al. --

Column 3,
Line 19, delete "abovereferenced" insert -- above-referenced --

Column 7,
Line 59, delete " $Ad(t)cos(\chi^t+\phi)+n(t)$ " insert -- $Ad(t)cos(\omega^t+\phi)+n(t)$ --

UNITED STATES PATENT AND TRADEMARK OFFICE
CERTIFICATE OF CORRECTION

PATENT NO. : 6,397,083 B2
DATED : May 28, 2002
INVENTOR(S) : Gayle Patrick Martin, Steven D. Halford and John C. Henry, III It is certified that error appears in the above-identified patent and that said Letters Patent is hereby corrected as shown below:

<u>Column 8,</u>
Line 8, delete "($\eta$-N" insert -- ($\eta$-N) --
Line 16, delete "Rn" insert -- $Rn^{-1}$ --

Signed and Sealed this

Twenty-sixth Day of November, 2002

Attest:

JAMES E. ROGAN
Attesting Officer  Director of the United States Patent and Trademark Office